United States Patent Office 3,766,144
Patented Oct. 16, 1973

3,766,144
COPOLYMERS PREPARED BY REACTING AN ACRYLAMIDE OR METHACRYLAMIDE CO-POLYMER WITH FORMALDEHYDE AND THEN WITH AN UNSATURATED CARBOXYLIC ACID
Alan George Hudson and Kevin John O'Hara, Maidstone, England, assignors to Coates Brothers & Company Limited, London, England
No Drawing. Filed Nov. 22, 1972, Ser. No. 308,724
Claims priority, application Great Britain, Nov. 25, 1971, 54,830/71
Int. Cl. C08g 9/36
U.S. Cl. 260—72 R      8 Claims

ABSTRACT OF THE DISCLOSURE

The invention provides a process for the preparation of a copolymer containing pendant ethylenically unsaturated side chains which comprises reacting a copolymer of acrylamide or methacrylamide with formaldehyde and reacting the resultant product with ethylenically unsaturated monocarboxylic acid, e.g. acrylic or methacrylic acid or hydroxyalkyl ester or hydroxycycloalkyl ester thereof. The resultant copolymer may be defined as containing repeating units derived from one or more ethylenically unsaturated monomers and reepating units of the formula:

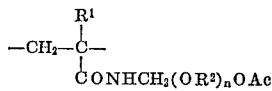

in which $R^1$ is a hydrogen atom or a methyl group: $R^2$ is a divalent alkylene or cycloalkylene group; Ac is the acyl residue of an ethylenically unsaturated monocarboxylic acid; and $n$ is 0 or 1.

---

This invention is concerned with improvements in and relating to new copolymers having pendant ethylenically unsaturated side chains and polymerizable compositions containing such copolymers, which compositions are particularly suitable for curing by electron beam radiation.

More particularly, the present invention relates to copolymers derived from copolymers of acrylamide or methacrylamide and containing ethylenically unsaturated side chains attached to the polymer backbone via an amide nitrogen atom.

It has now been found, in accordance with the present invention, that polymerizable polymers containing pendant ethylenically unsaturated side chains may be prepared by reacting a copolymer of acrylamide or methacrylamide with formaldehyde and reacting the resultant product with an ethylenically unsaturated monocarboxylic acid or hydroxyalkyl or hydroxycycloalkyl ester thereof.

The copolymers produced in accordance with the invention are particularly suitable for incorporation in curable compositions comprising the copolymer dissolved in one or more ethylenically unsaturated monomers and such compositions may be used, for example, as paints, varnishes, rolling enamels, or printing inks, or adhesive interlayers or impregnants in laminates, bonded fibrous structures or the like.

The copolymers of the invention are, as stated above, derived from copolymers of acrylamide or methacrylamide, which are prepared by copolymerizing acrylamide or methacrylamide with one or more other ethylenically unsaturated monomers copolymerizable therewith, for example, styrene, an alkyl styrene, or an alkyl or cycloalkyl ester of acrylic or methacrylic acid. This copolymerization may be carried out by any suitable technique known to the art but is preferably carried out as a solution polymerization in the presence of a free radical catalyst such as an organic peroxide.

In accordance with the invention, the acrylamide or methacrylamide copolymer is reacted with formaldehyde to convert at least a portion of the amide groups therein into N-methylol amide groups, and this N-methylol amide group-containing copolymer is the reacted with an alpha-beta-ethylenically unsaturated monocarboxylic acid or hydroxyalkyl or hydroxycycloalkyl ester thereof. Where the N-methylol amide group-containing copolymer is reacted with the unsaturated acid per se and it is believed that the N-methylol groups are esterified to give pendant groups containing ethylenic unsaturation derived from the carboxylic acid and when the copolymer is reacted with the hydroxy ester of the acid, the N-methylol groups are etherified to give pendant unsaturated groups. It is not necessary that the two steps be carried out sequentially but they may be carried out simultaneously.

The acrylamide or methacrylamide polymers which are used as starting materials are copolymers containing units derived from ethylenically unsaturated monomers other than acrylamide or methacrylamide and units of the formula:

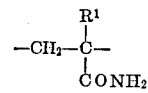

(in which $R^1$ is a hydrogen atom or a methyl group).

Thus, the process of the invention may be represented by the following reaction scheme:

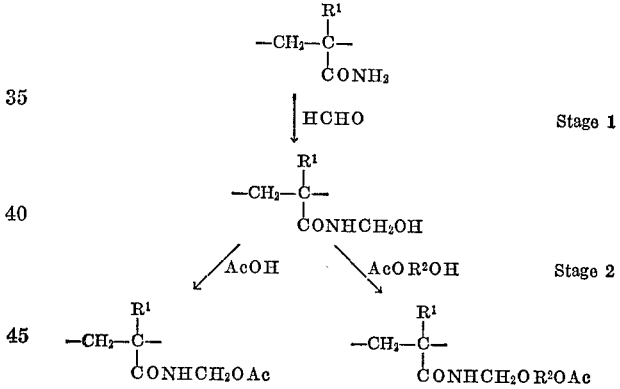

(in which Ac is the acyl residue of an ethylenically unsaturated monocarboxylic acid and $R^2$ is a divalent alkylene or cycloalkylene radical).

The copolymers produced in accordance with the invention may thus be described as copolymers containing units derived from one or more ethylenically unsaturated monomers and units of the formula:

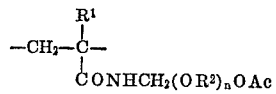

in which $R^1$, $R^2$ and Ac have the meanings defined above and $n$ is 0 or 1.

The final product of the process, which is a copolymer having pendant ethylenically unsaturated side chains is dissolved in ethylenically unsaturated monomers such as styrene, an alkyl styrene, or an alkyl or cycloalkyl ester of acrylic or methacrylic acid, to give a cross-linkable, curable composition. This composition may, if desired, be pigmented for example by introducing therein finely divided pigments.

The resultant composition may be cured (cross-linked), in accordance with a preferred embodiment of the invention, by exposure to an electron beam. Alternatively the composition may be cured by exposure to ultraviolet irradiation provided that a UV sensitiser is added to the composition, or the composition may be thermally cured provided that a free radical catalyst, such as an organic peroxide, is added to the composition. In any event, the the curing of the composition by whatever means are adopted, will take place as and when the composition has been applied to the appropriate substrate(s) in a suitable manner, e.g. has been coated on to a substrate to form a protective or decorative coating thereof.

The acrylamide or methacrylamide copolymer from which the polymers of the invention are prepared, should be derived from a monomer mixture containing not less than 5 mole percent of acrylamide and/or methacrylamide. The upper limit of acrylamide and/or methacrylamide content will be determined by practical consideration of the mechanical properties of the final cross-linked material. In general, however, it is preferred not to use more than 25 mole percent of acrylamide and/or methacrylamide so as to avoid undue brittleness of the final product. The use of too little amide leads to incompletely cured final products whereas the use of too much amide leads to a final product having an excessive density of cross-linkages and inferior film properties.

The components of the acrylamide and/or methacrylamide copolymer will be selected to provide the polymer with the desired degree of flexibility as is well known in the art. Thus, for example, styrene and methyl methacrylate yield hard, brittle polymers whilst butyl acrylate yields soft, flexible polymers. A mixture of, for example, methyl methacrylate and butyl acrylate yields a polymer of intermediate hardness and flexibility. The proportions of these ingredients may be chosen to give the desired levels of these properties as required for any particular application.

As stated above, the acrylamide and/or methacrylamide copolymer is preferably prepared by solution polymerization and suitable solvents for this polymerization are mixtures of an aliphatic alcohol with an aromatic hydrocarbon, particularly suitable mixtures being ethanol/xylene and butanol/xylene mixtures. Suitable polymerization catalysts are free radical sources, such as benzoyl peroxide, having a relatively low decomposition temperature and a relatively short half life. The use of such initiators or catalysts ensures that no appreciable concentration of free radicals is present in the subsequent stages of the process. The molecular weight of the copolymer may be controlled by incorporation in the polymerization mixture of chain transfer agents such as, for example, mercaptans. When the polymerization is complete (as assessed by the determination of non-volatile matter) the alcoholic component of the solvent is removed by distillation. If the solvent used is a butanol/xylene mixture such distillation will result in the removal of some xylene since xylene forms an azeotrope with butanol and such xylene should be repeated before proceeding with the subsequent stages of the process. If, however, the solvent is an ethanol/xylene mixture, this problem does not arise since there is no ethanol-xylene azeotrope.

As stated above, the methylolation and esterification or etherification may be carried out sequentially, but it is preferred to carry them out simultaneously since this has economic advantages with regard to plant utilisation. Thus, in the combined process, formaldehyde (preferably in the form of paraformaldehyde) is added to the aromatic hydrocarbon solution of the copolymer from the first stage together with the unsaturated monocarboxylic acid or hydroxy ester thereof. The mole ratio of formaldehyde to unsaturated acid or ester should not be less than about 1:1, somewhat higher ratios may be used but require careful process control to avoid premature cross-linking occurring during the progress of the reaction. The preferred ratio of formaldehyde to unsaturated acid or ester is 1:1. When the ester is used, it is generally necessary to add a small amount of an acidic catalyst to promote the etherification reaction and, for example, about 1% by weight of a 25% solution of acid butyl phosphate in butanol proves suitable and sufficient.

Reaction of the copolymer with the formaldehyde and unsaturated ester or acid is suitably carried out so that the water evolved is removed as it is formed e.g. by azeotropic distillation, typically using a Dean & Stark type separator. The presence of a polymerization inhibitor, such as hydroquinone, is generally desirable at this stage in order to prevent reaction at the double bonds of the unsaturated acid or ester. The completion of the reaction is indicated by the cessation of the evolution of water.

When the reaction is complete, solvent is removed, for example by vacuum distillation at a temperature of not more than 100° C., and the resultant copolymer in accordance with the invention is dissolved in a liquid ethylenically unsaturated monomer copolymerizable therewith to yield a composition having a viscosity suitable for the intended end use thereof.

A wide variety of ethylenically unsaturated liquid monomers may be used in the compositions of the invention and examples of such monmers include styrene, vinyl toluene, divinyl benzene, alkyl acrylates, cycloalkyl acrylates, alkyl methacrylates, cycloalkyl methacrylates, and the dialkyl itaconates. If, however, it is intended to cure the composition by electron-beam irradiation particularly suitable monomers are the hydroxyalkyl acrylates, the cycloalkyl acrylates, the diacrylates of dihydric alcohols and the di- and tri- acrylates of trihydric alcohols; for example 2-hydroxyethyl acrylate, cyclohexyl acrylate, ethylene glycol diacrylate, neopentyl glycol diacrylate, trimethylolpropane triacrylate and glycerol diacrylate.

In order that the invention may be well understood, the following examples are given by way of illustration only.

EXAMPLE 1

(a) First stage—preparation of copolymer 1750 g. n-butanol and 1750 g. of xylene were charged under nitrogen to a polymerisation vessel equipped with stirrer, tap funnel, thermometer and reflux condenser. The temperature was raised to reflux and the following mixture was run in through the tap funnel at an uniform rate over a period of 3 hours.

|  | G. |
|---|---|
| Methyl methacrylate | 1065 |
| Ethyl acrylate | 2055 |
| Acrylamide | 380 |
| 70% dispersion of benzoyl peroxide in dibutyl phthalate | 50 |
| Tert-dodecyl mercaptan | 35 |
| n-Butanol | 600 |

Reflux was continued until polymreisation was substantially complete. Butanol was removed by azeotropic distillation and the product was diluted with xylene to a non-volatile content of 63.1%.

(b) Second and third stages—combined preparation of copolymer of invention 250 g. of the product of (a) above 59.6 g. of 2-hydroxyethyl acrylate, 0.2 g. hydroquinone, and 3.0 g. of a 25% solution of acid butyl phosphate in butanol were charged to a stirred reactor equipped with a Dean & Stark separator and heated to 115° C.

7.7 g. of paraformaldehyde were then added and the temperature was raised to reflux. Reflux was continued until no more water was collected in the Dean & Stark separator. The volume of water collected was 4.25 ml. The Dean & Stark separator was then replaced by a distillation set and most of the xylene was removed by vacuum distillation at a temperature not exceedingly 100° C. The product contained about 10% residual xylene.

EXAMPLE 2

The product of Example 1(b) was dissolved in 78.6 g. of 2-hydroxyethyl acrylate and the solution was applied to phosphate pretreated steel panels by means of a bar coater. These panels were then subjected to electron-beam irradiation using an accelerator voltage of 125 kv. and a beam current of 6.7 ma. It was found that the films were cured by a dose of 14 megarads.

EXAMPLE 3

The produce of Example 2 was repeated replacing the 2-hydroxyethyl acrylate by other polymerisable liquid monomers. Dose to cure was as follows:

| | Megarads |
|---|---|
| Styrene | 69 |
| Methyl methacrylate | 14 |
| Butyl acrylate | 18 |
| Butyl methacrylate | 51 |
| Ethylene glycol dimethacrylate | 18 |
| Trimethylolpropane trimethacrylate | 4.6 |
| Cyclohexyl acrylate | 12 |

EXAMPLE 4

250 g. of the product of Example 1(a), 19 g. acrylic acid and 0.2 g. hydroquinone were heated together in a stirred reactor equipped with a Dean & Stark separator and 6.3 g. of paraformaldehyde was added at 116° C. The temperature was raised to reflux and 3.5 ml. water was removed following the procedure of Example 1(b). Still following that procedure xylene was removed by vacuum distillation to yield a product containing only 7% xylene. This was finally dissolved in 69 g. 2-hydroxyethyl acrylate.

EXAMPLE 5

The procedure of Example 2 was followed using the product of Example 4, in place of the produce of Example 1(b). Dose to cure was found to be 14 megarads.

We claim:

1. A copolymer containing repeating units derived from one or more ethylenically unsaturated monomers and repeating units of the formula:

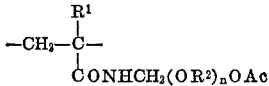

in which $R^1$ is a hydrogen atom or a methyl group: $R^2$ is a divalent alkylene or cycloalkylene group; Ac is the acyl residue of an ethylenically unsaturated monocarboxylic acid; and $n$ is 0 or 1.

2. A process for the preparation of a copolymer containing pendant ethylenically unsaturated side chains which comprises reacting a copolymer of acrylamide or methacrylamide with formaldehyde and reacting the resultant product with an ethyenically unsaturated monocarboxylic acid or hydroxyalkyl ester or hydroxycycloalkyl esters thereof.

3. A process according to claim 2 in which the copolymer is a copolymer of acrylamide or methacrylamide with styrene, an alkyl styrene or an alkyl or cycloalkyl ester of carylic or methacrylic acid.

4. A process according to claim 2 in which the copolymer is derived from a monomer mixture containing from about 5 to about 25% by weight of acrylamide or methacrylamide.

5. A process according to claim 2 in which the copolymer is reacted with the formaldehyde and the unsaturated acid or ester thereof simultaneously.

6. A process according to claim 5 in which the molar ratio of formaldehyde to unsaturated acid or ester thereof is about 1:1.

7. A process according to claim 2 in which the unsaturated acid is acrylic acid or methacrylic acid.

8. A polymerizable composition comprising a copolymer containing repeating units of the formula:

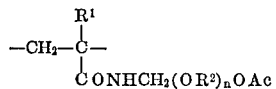

in which $R^1$ is a hydrogen atom or a methyl group: $R^2$ is a divalent alkylene or cycloalkylene group; Ac is the acyl residue of an ethylenically unsaturated monocarboxylic acid; and $n$ is 0 or 1, together with one or more other ethylenically unsaturated monomers.

References Cited
UNITED STATES PATENTS

| 2,870,116 | 1/1959 | Vogel et al. | 260—72 R X |
| 2,940,944 | 6/1960 | Christenson | 260—72 R X |
| 2,978,437 | 4/1961 | Christenson | 260—72 R |
| 3,079,434 | 2/1963 | Christenson et al. | 260—72 R X |
| 3,466,266 | 9/1969 | Nagata et al. | 260—72 R X |

HOWARD E. SCHAIN, Primary Examiner

U.S. Cl. X.R.

204—159.19